(12) United States Patent
Kwatra et al.

(10) Patent No.: US 11,224,801 B2
(45) Date of Patent: Jan. 18, 2022

(54) ENHANCED SPLIT-SCREEN DISPLAY VIA AUGMENTED REALITY

(71) Applicant: International Business Machines Corporation, Armonk, NY (US)

(72) Inventors: Shikhar Kwatra, Durham, NC (US); Thomas Jefferson Sandridge, New York, NY (US); Robert Huntington Grant, Atlanta, GA (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/691,648

(22) Filed: Nov. 22, 2019

(65) Prior Publication Data

US 2021/0154570 A1 May 27, 2021

(51) Int. Cl.
| | |
|---|---|
| *A63F 13/00* | (2014.01) |
| *A63F 13/26* | (2014.01) |
| *G09G 5/12* | (2006.01) |
| *G09G 5/14* | (2006.01) |
| *A63F 13/98* | (2014.01) |

(52) U.S. Cl.
CPC ............ *A63F 13/26* (2014.09); *A63F 13/98* (2014.09); *G09G 5/12* (2013.01); *G09G 5/14* (2013.01); *G09G 2354/00* (2013.01)

(58) Field of Classification Search
CPC ........ A63F 13/843; A63F 13/10; A63F 13/52; A63F 2300/203; A63F 2300/8088; A63F 13/00; A63F 13/02; A63F 13/08; A63F 2300/308; A63F 2300/64; G06T 19/006; G06T 2215/16; G09G 2340/12; G09G 3/003; G02B 27/017
See application file for complete search history.

(56) References Cited

U.S. PATENT DOCUMENTS

| | | |
|---|---|---|
| 5,470,080 A | 11/1995 | Naka et al. |
| 8,031,402 B2 | 10/2011 | Tripp |
| 8,576,276 B2 | 11/2013 | Bar-Zeev |
| 9,712,811 B2 | 7/2017 | Keys et al. |
| 10,249,091 B2 | 4/2019 | DeFaria et al. |

(Continued)

OTHER PUBLICATIONS

"How can I detect TV Screen from an Image with OpenCV or Another Library?", Stack Overflow, <https://stackoverflow.com/questions/24363933/how-can-i-detect-tv-screen-from-an-image-with-opencv-or-another-library>, edited May 23, 2017, 6 pages.

(Continued)

*Primary Examiner* — Justin L Myhr
(74) *Attorney, Agent, or Firm* — William H. Hartwell; Brian M. Restauro (57) ABSTRACT

A method includes syncing augmented reality (AR) enabled equipment to a videogaming system, identifying two or more portions of a display screen belonging to two or more players, identifying a portion of the display screen belonging to a selected user and one or more remaining portions of the display screen not belonging to the selected user, obscuring the one or more portions of the display screen not belonging to the selected user, and displaying the determined portion of the display screen belonging to the selected user via the synced AR enabled equipment. A computer program product and computer system corresponding to the method are also disclosed.

17 Claims, 5 Drawing Sheets

(56) References Cited

U.S. PATENT DOCUMENTS

| | | | |
|---|---|---|---|
| 2002/0010026 A1 | 1/2002 | York et al. | |
| 2008/0158095 A1* | 7/2008 | Neidrich | G09G 3/20 |
| | | | 345/6 |
| 2008/0165176 A1* | 7/2008 | Archer | A63F 13/52 |
| | | | 345/213 |
| 2009/0174728 A1 | 7/2009 | Ferrer et al. | |
| 2009/0274219 A1* | 11/2009 | Greene | H04N 19/115 |
| | | | 375/240.26 |
| 2012/0050502 A1* | 3/2012 | Chi | H04N 13/398 |
| | | | 348/51 |
| 2012/0050507 A1* | 3/2012 | Keys | H04N 13/341 |
| | | | 348/56 |
| 2016/0054567 A1* | 2/2016 | Kim | H04L 65/403 |
| | | | 345/8 |

OTHER PUBLICATIONS

"AirPlay", Wikipedia, The Free Encyclopedia, <https://en.wikipedia.org/wiki/AirPlay>, This page was last edited on Jun. 12, 2019, 6 pages.

Chang et al., "GUI Testing Using Computer Vision", CHI 2010, Apr. 10-15, 2010, Atlanta, Georgia, USA Copyright 2010 ACM 978-1-60558-929-9/10/04, 10 pages.

Disclosed Anonymously, "System for Masking Confidential Areas on Presentation Screen and Displaying Unmasked Content in Presenters Mixed Reality Glasses", ip.cpm, IPCOM000255529D, Publication Date: Oct. 1, 2018, 2 pages.

Disclosed Anonymously, "Three Dimensional Imaging using Augmented Reality",ip.com, IPCOM000242992D, Publication Date: Sep. 6, 2015, 2 pages.

"IBM Cloud for gaming" from Internet Archive Wayback Machine, Nov. 6, 2018, 5 pages, <https://web.archive.org/web/20181106232251/https://www.ibm.com/cloud/gaming>.

* cited by examiner

ENHANCED SPLIT-SCREEN DISPLAY VIA AUGMENTED REALITY

BACKGROUND

The present invention related generally to the field of videogaming, and more specifically to the enhancement of split-screen multiplayer videogaming via augmented reality enabled equipment.

In videogaming, one prominent feature is multiplayer functionality. Multiplayer videogaming describes a videogaming scenario in which more than one user can play in the same game environment at the same time, either locally (i.e. on the same videogaming system) or online over the Internet (i.e. on different videogaming systems connected by a wired or wireless network). Local multiplayer videogames require players to share resources of a single videogaming system, including one display screen. The display screen is often split into portions (known as split screen gameplay), where each portion corresponds to a given user. In other words, each user is assigned a portion of the display screen and any input the user performs on a controller affects that user's portion of the display screen.

SUMMARY

As disclosed herein, a method includes syncing augmented reality (AR) enabled equipment to a videogaming system, identifying two or more portions of a display screen belonging to two or more players, identifying a portion of the display screen belonging to a selected user and one or more remaining portions of the display screen not belonging to the selected user, obscuring the one or more portions of the display screen not belonging to the selected user, and displaying the determined portion of the display screen belonging to the selected user via the synced AR enabled equipment. A computer program product and computer system corresponding to the method are also disclosed.

DETAILED DESCRIPTION

Multiplayer videogaming has become very popular. Largescale competitions exist around the world pitting the best gamers against each other for prizes and prestige. While multiplayer gaming has increased in popularity, split-screen videogaming has waned in popularity. Factors that have led to this decrease in popularity include the smaller screen for user in split-screen and the potential for cheating by looking at the other users' screens to gain an advantage. Online multiplayer videogaming lets users enjoy a full screen experience without the fear of other users cheating by looking at their screen.

Augmented reality (AR) is an interactive experience of a real-world environment where the objects that reside in the real-world are enhanced by computer-generated perceptual information, sometimes across multiple sensory modalities, including visual, auditory, haptic, somatosensory and olfactory. AR blends the real world and the digital world, enabling users to change the world visible to them. By using AR-equipment, a user playing a split-screen multiplayer videogame may view only the portion of a display screen corresponding to that user's actions, and improve the user's experience by enhancing the corresponding portion of the display screen. The present invention improves the split-screen videogaming by providing each user a full screen experience. Furthermore, the use of augmented reality eliminates the possibility of cheating by looking at another user's screen.

The present invention will now be described in detail with reference to the Figures. Implementation of embodiments of the invention may take a variety of forms, and exemplary implementation details are discussed subsequently with reference to the Figures.

Figure 1:
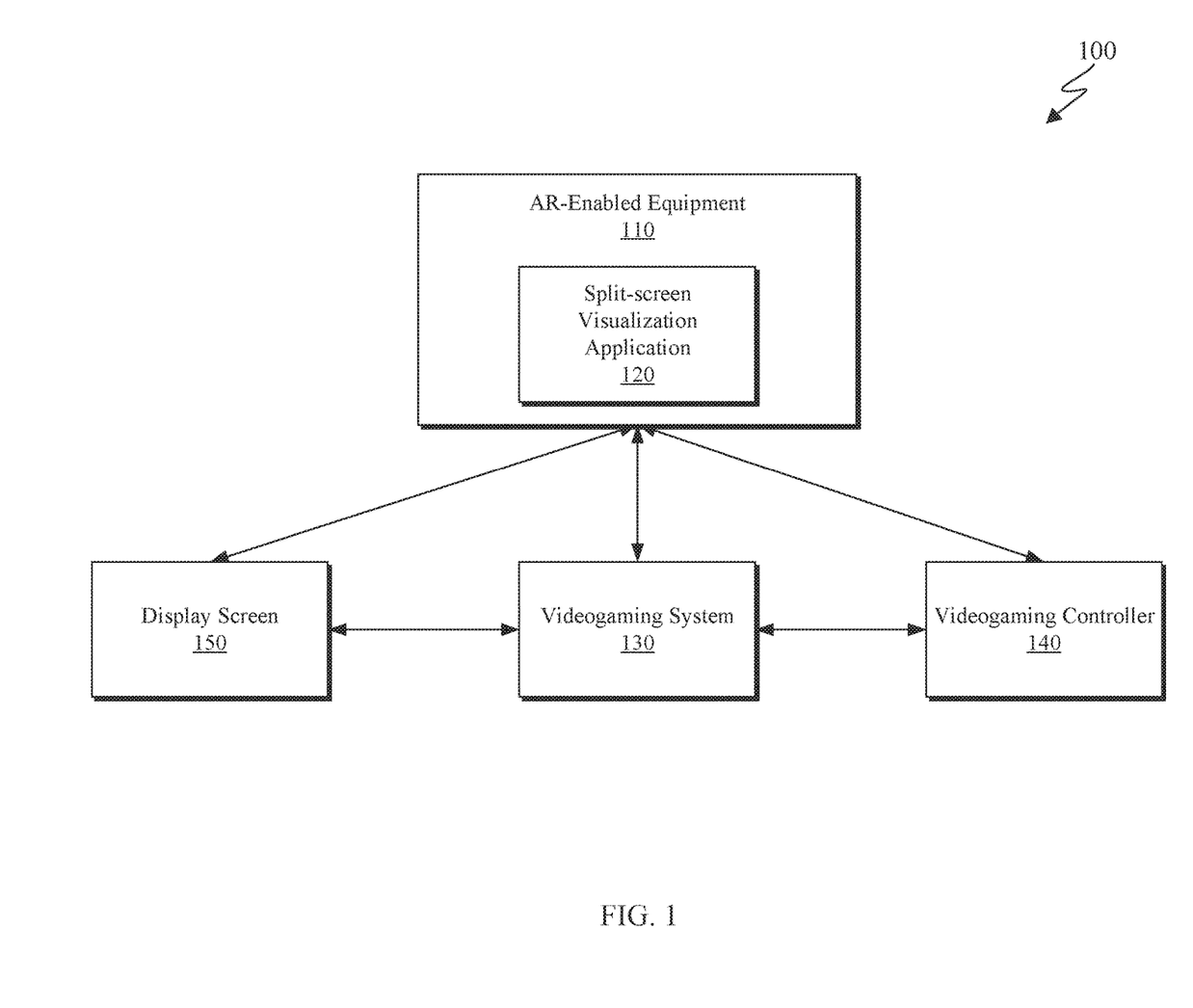
FIG. 1 is a block diagram depicting a split-screen visualization system for enhanced visualization and facilitation of a local shared-screen multiplayer videogaming system via augmented reality (AR) enabled equipment.

FIG. 1 is a block diagram depicting a split-screen visualization system 100 for enhanced visualization and facilitation of a local shared-screen multiplayer videogaming system via augmented reality (AR) enabled equipment. As depicted, split-screen visualization system 100 includes AR-enabled equipment 110, split-screen visualization application 120, videogaming system 130, videogaming controller 140, and display screen 150. Split-screen visualization system 100 may be configured to enhance a user's portion of a screen for split-screen multiplayer videogaming.

AR-enabled equipment 110 may be goggles, glasses, headsets, or any other AR-enabled equipment known in the art. In general, AR-enabled equipment 110 is representative of any AR-enabled equipment that a user may look through and provide an interactive experience of a real-world environment where the objects that reside in the real-world are enhanced by computer-generated perceptual information. AR-enabled equipment 110 is equipped with a camera or other feature that provides data about the physical world in which the viewpoint of AR-enabled equipment 110 has. In some embodiments, AR-enabled equipment may be configured to be capable of receiving and transmitting data, as described in greater detail with regard to FIG. 5. In another embodiment, videogaming system 130 may instead be configured to be capable of receiving and transmitting data, as described in greater detail with regard to FIG. 5. In yet another embodiment, AR-enabled equipment 110 and videogaming system may both be configured to be capable of receiving and transmitting data, as described in greater detail with regard to FIG. 5.

As depicted, AR-enabled equipment 110 comprises splitscreen visualization application 120. Split-screen visualization application 120 is configured to execute a split-screen visualization method for enhanced visualization and facilitation of a local shared-screen multiplayer videogaming system via player-based AR. One embodiment of an appropriate split-screen visualization method 200 is described with respect to FIG. 2. In general, split-screen visualization application 120 is representative of any application capable of identifying two or more portions of a display screen 150, receiving input from a controller 140, correlating input from a controller 140 with movement on a display screen 150, isolating a portion of a display screen 150, obscuring one or more portions of a display screen 150, and enhancing a portion of a display screen 150. While the depicted embodiment shows split-screen visualization application 120 housed on AR-enabled equipment 110, it should be appreciated that in another embodiment, split-screen visualization application 120 may be housed on videogaming system 130, controller 140, or display screen 150. In such an embodiment, split-screen visualization application may be capable of sending and receiving data to AR-enabled equipment 110.

Figure 4:
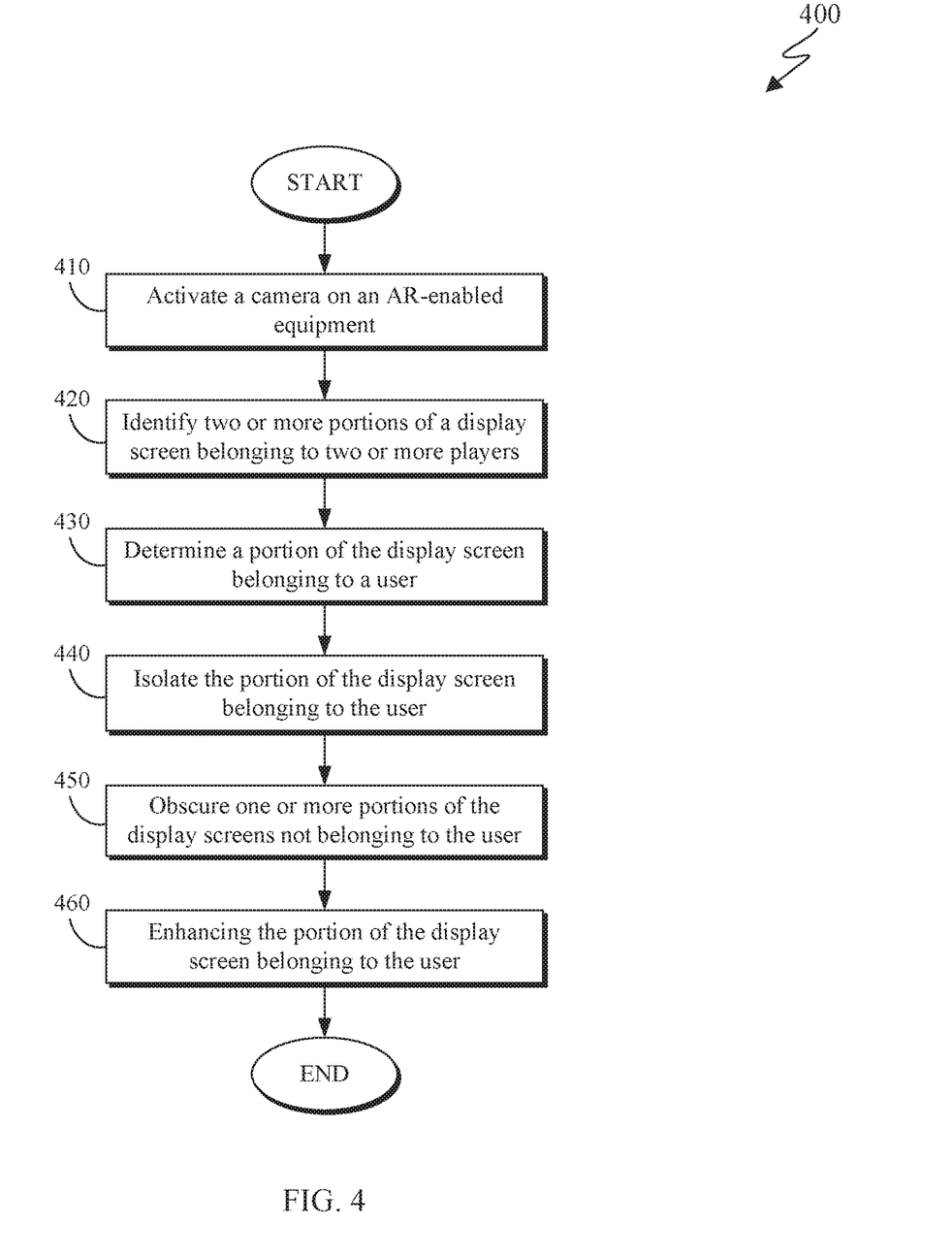
FIG. 4 is a flowchart depicting a split-screen visualization method for enhanced visualization and facilitation of a local shared-screen multiplayer videogaming system via player-based augmented reality (AR) for videogaming systems that are not AR compatible.
Figure 5:
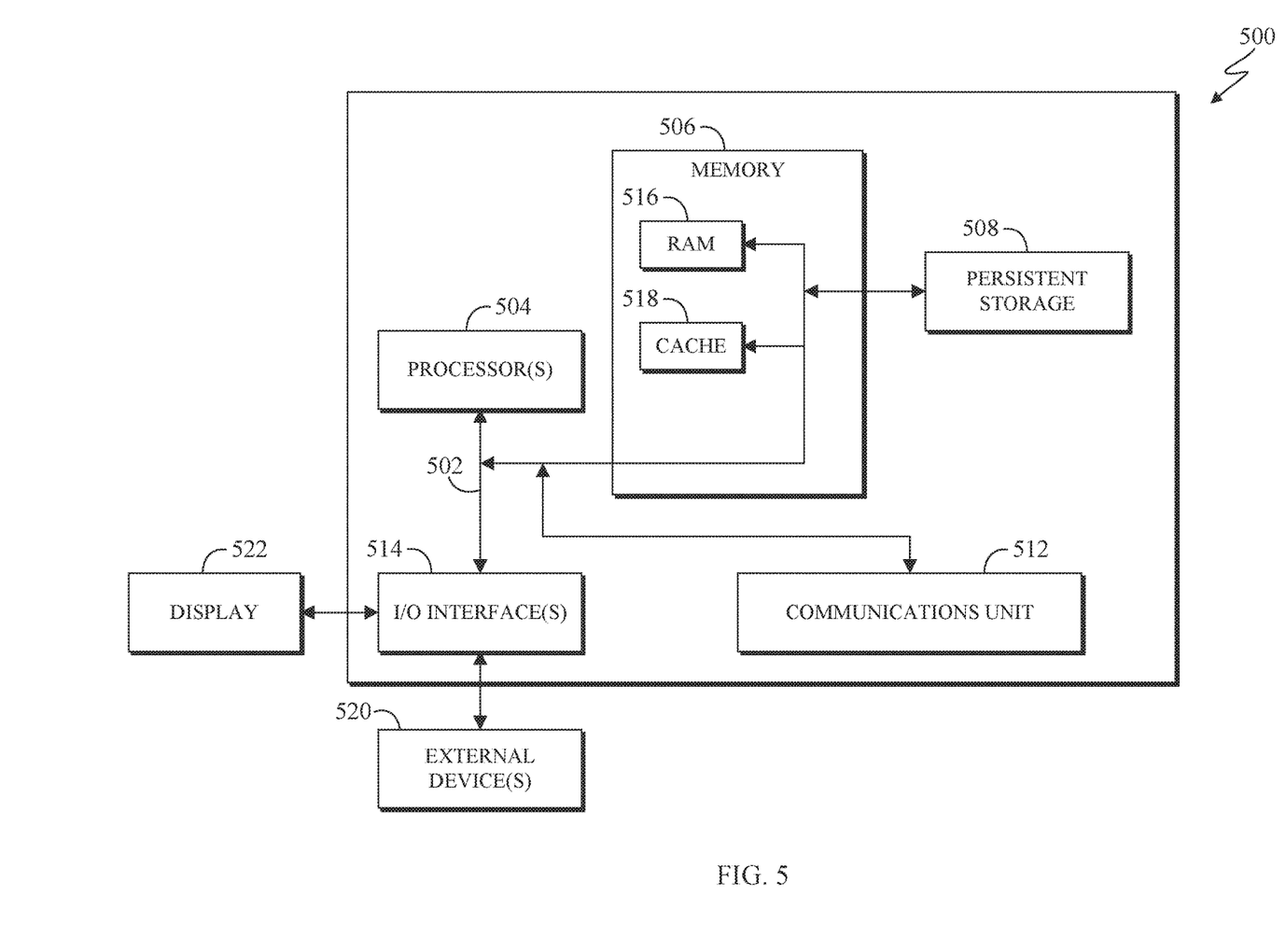
FIG. 5 is a block diagram of components of a computing system executing the split-screen visualization program, in accordance with an embodiment of the present invention.

Videogaming system 130 is representative of any a computer device that outputs a video signal or visual image to display a video game that one or more users can play. Videogaming system 130 may be configurable to output a visual image to display screen, receive input from controller 140, and send and receive data from split-screen visualization application 120. In some embodiments, videogaming system 130 comprises split-screen visualization application 130. In such an embodiment, split-screen visualization application 120 is capable of sending and receiving data from AR-enabled equipment 110. In some embodiments, videogaming system 130 is configured to receive and transmitting data, as depicted in FIG. 5. In some embodiments, videogaming system 130 is AR compatible. One embodiment of an appropriate split-screen visualization method 300 for an AR compatible videogaming system is described with respect to FIG. 3. In other embodiments, videogaming system 130 is not AR compatible. One embodiment of an appropriate split-screen visualization method 400 for a non-AR compatible videogaming system is described with respect to FIG. 4.

Videogaming controller 140 is an input device used to provide input to a videogaming system 130. Videogaming controller 140 may comprise directional pads, multiple buttons, analog sticks, joysticks, motion detection, touch screens and other features known in the art. As depicted, videogaming controller 140 is capable of sending input data to split-screen visualization application 120.

Display screen 150 is a television, monitor, tablet, or any other display screen known in the art. In general, display screen 150 is representative of any electronic device capable of receiving data from a videogaming system 130 and displaying that data as a visual image.

While the depicted embodiment shows AR-equipment 110, split-screen visualization application 120, videogaming system 130, videogaming controller 140, and display screen 150 operably connected, it should be appreciated that this is only one embodiment of an appropriate split-screen visualization system. In other embodiments, each component of split-screen visualization system 100 may be connected via a network. Examples of an appropriate network include, for example a local area network ("LAN"), a wide area network ("WAN") such as the Internet, or a combination of the two, and may include wired, wireless, or fiber optic connections. In general, an appropriate network may be any combination of connections and protocols that will support communications between AR-equipment 110, split-screen visualization application 120, videogaming system 130, videogaming controller 140, and display screen 150. In some embodiments, AR-equipment 110 may not be connected to videogaming system 130. One embodiment of an appropriate split-screen visualization method 400 is described with respect to FIG. 4.

Figure 2:
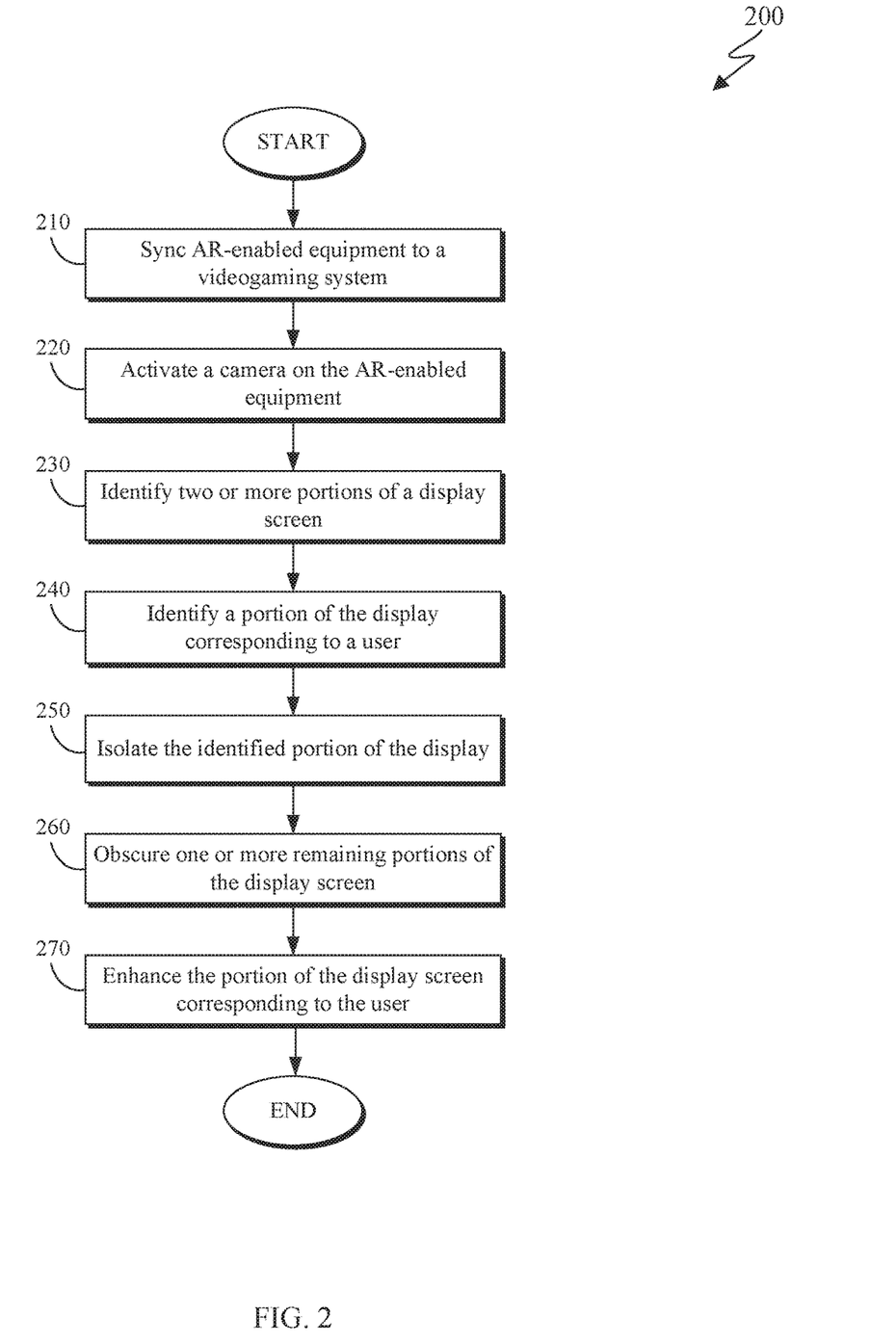
FIG. 2 is a flowchart depicting a split-screen visualization method for enhanced visualization and facilitation of a local shared-screen multiplayer videogaming system via player-based augmented reality (AR).

FIG. 2 is a flowchart depicting a split-screen visualization method 200 for enhanced visualization and facilitation of a local shared-screen multiplayer videogaming system via player-based augmented reality (AR). As depicted, method 200 includes syncing (210) AR-enabled equipment to a videogaming system, activating (220) a camera on an AR-enabled equipment, identifying (230) two or more portions of a display screen belonging to two or more players, determining (240) a portion of the display screen belonging to a user, isolating (250) the portion of the display screen belonging to the user, obscuring (260) one or more portions of the display screen not belonging to the user, and enhancing (270) the portion of the display screen belonging to the user.

Figure 3:
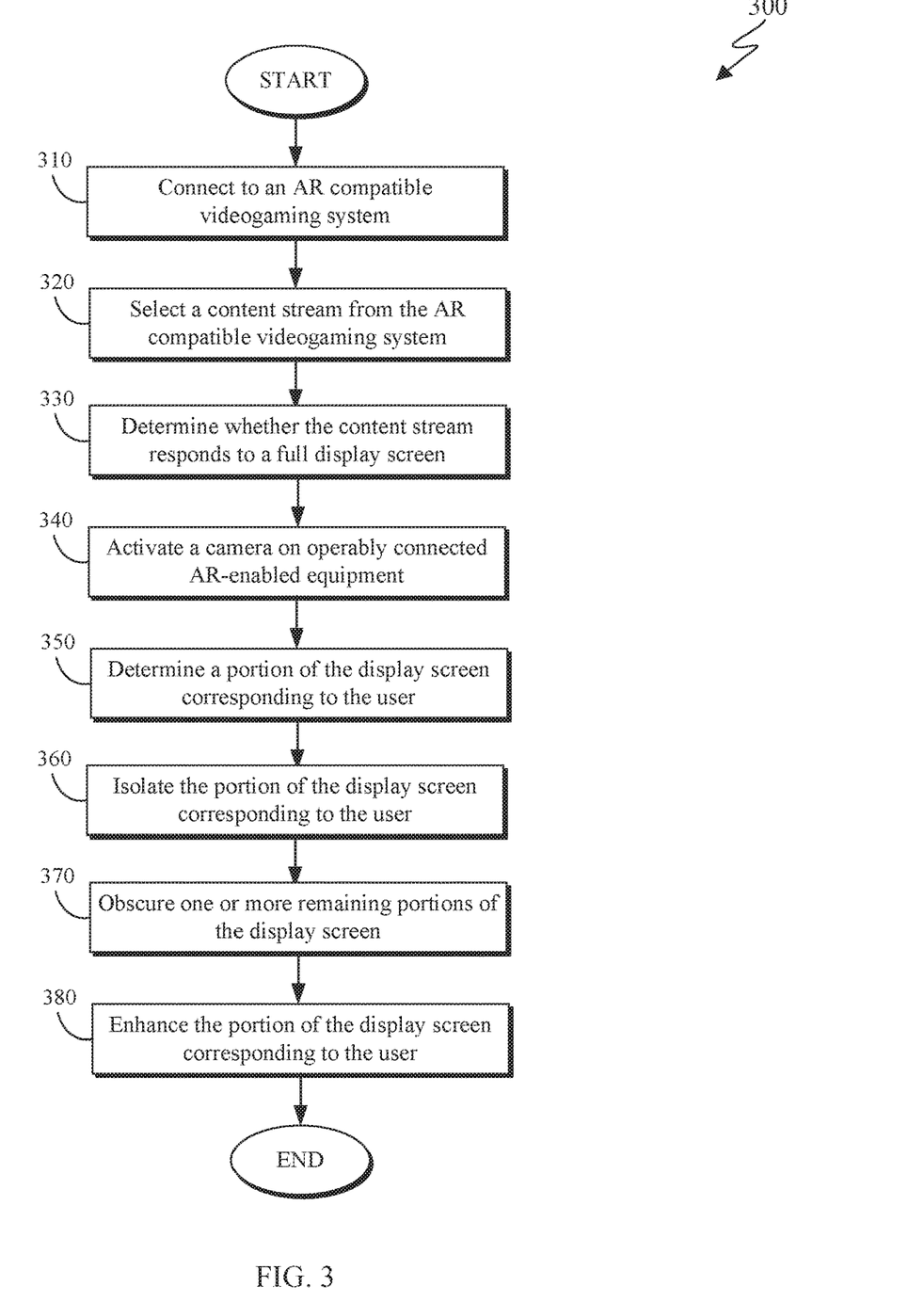
FIG. 3 is a flowchart depicting a split-screen visualization method for enhanced visualization and facilitation of a local shared-screen multiplayer videogaming system via player-based augmented reality (AR) for a videogaming system that is AR compatible.

Syncing (210) an AR-enabled equipment to a videogaming system may include split-screen visualization application 120 connecting to a videogaming system. In at least one embodiment, the videogaming system is AR compatible. In such an embodiment, split-screen visualization application 120 may be able to connect to the videogaming system. In at least one embodiment in which the videogaming system is AR compatible, split-screen visualization application 120 may connect to the videogaming system via a wireless connection. Wireless connections include, but are not limited to, Bluetooth™ and WIFI. In another embodiment in which the videogaming system is AR compatible, split-screen visualization application 120 may connect to the videogaming system via a physical connection. Examples of physical connections include, but are not limited to, coaxial cables and fiber optic cables. In an embodiment in which the videogaming system is AR-compatible, split-screen visualization application 120 may execute method 300 for enhanced visualization and facilitation of a local shared-screen multiplayer videogaming system via player-based augmented reality (AR) for a videogaming system that is AR compatible. In an embodiment in which the videogaming system is not AR compatible, split-screen visualization application 120 may execute method 400 for enhanced visualization and facilitation of a local shared-screen multiplayer videogaming system via player-based augmented reality (AR) for a videogaming system that is not AR compatible.

Activating (220) a camera on an AR-enabled equipment may include split-screen visualization application 120 enabling a camera that is operably connected to the AR-enabled equipment. In at least one embodiment, split-screen visualization application 120 may enable the camera concurrently with the activation of the AR-enabled equipment. In another embodiment, split-screen visualization application 120 may enable the camera after the AR-enabled equipment are activated. In yet another embodiment, a user may activate the camera. Examples of AR-enabled equipment include, but are not limited to, glasses and headsets.

Identifying (230) two or more portions of a display screen belonging to two or more players may include split-screen visualization application 120 selecting a content stream from an AR compatible videogaming system. Split-screen visualization application may then analyze the selected content stream to determine a number of players and a number of portions of the display screen. Identifying (230) two or more portions of a display screen belonging to two or more players may include split-screen visualization application 120 detecting display screen using the camera that is operably connected to the AR-enabled equipment. Split-screen visualization application 120 may then detect the semantic concept of player screens on the display screen using the camera that is operably connected to the AR-enabled equipment. Detecting the semantic concept of player screens may include split screen application 120 detecting screen dividers on the display screen. Screen dividers may be indicated by any visual representation of a division of a display screen, including, but not limited to, dividing lines and borders around each distinct portion of the whole display screen. The display screen may be divided into two or more portions, reflecting the two or more players of the local shared-screen multiplayer videogaming system. For example, the display screen may be divided into four quadrants, each corresponding to one of four players of the local shared-screen multiplayer videogaming system. If there are three players, the display screen may be divided into four quadrants: three screens each corresponding to one of the three users and one blank screen. If there are two players, the display screen may be divided in half, where each half corresponds to one of the two players. Divisions in half may be vertical or horizontal. In some embodiments, the size of each portion of the display screen is proportional to the number of players. In another embodiment, the size of each portion of the display screen is not proportional to the number of players. In at least one embodiment, split-screen visualization application 120 may use an image recognition algorithm with machine learning to detect screen dividers.

Determining (240) a portion of the display screen belonging to a user may include split-screen visualization application 120 analyzing the content stream selected form an AR compatible videogaming system to identify whether the content corresponds to the full display screen or to the portion of the display screen corresponding to the user. If the content stream corresponds to a portion of a display screen belonging to a user, then split-screen visualization application 120 may obscure (260) one or more portions of the display screen not belonging to the user. If the content stream corresponds to a full display screen, then split-screen visualization application 120 may then correlate one or more movements on the screen with one or more user inputs on the AR compatible videogaming system controller. In some embodiments, split-screen visualization application 120 may use a camera operably connected to the AR-enabled equipment to correlate one or more movements on the screen with one or more user inputs on the AR compatible videogaming system controller. In other embodiments, split-screen visualization application 120 may use the selected content stream to correlate one or more movements on the screen with one or more user inputs on a videogaming system controller. In some embodiments, split-screen visualization application 120 may correlate user-selected input on the controller with movements on the screen. In another embodiment, split-screen visualization application 120 may utilize semantic understanding of game content and prompt one or more controller input for the user to execute. In an embodiment in which more than one movement and input are correlated, split-screen visualization application 120 may utilize a predictive algorithm for display screen-to-AR correlation. The algorithm may utilize user input on the controller and visual changes on the display screen to determine a level of confidence that a particular portion of the screen corresponds to the user. If the level of confidence exceeds a predetermined threshold value, split-screen visualization application 120 may establish a positive association with the corresponding portion of the display screen and the user. In yet another embodiment, split-screen visualization application 120 may allow for a manual override, where the user selects the corresponding portion of the display screen using an action known in the art. These actions include, but are not limited to, input on the videogame controller and pointing to the portion of the screen corresponding to the user. Determining (240) a portion of a display screen belonging to a user may include split-screen visualization application 120 correlating one or more movements on the display screen with one or more user inputs on a non-AR compatible videogaming system controller. In at least one embodiment, split-screen visualization application 120 may use a camera operably connected to the AR-enabled equipment to detect movement on the display screen in order to correlate the one or more movements on the display screen with the one or more user inputs on the non-AR compatible videogaming system controller. In some embodiments, split-screen visualization application 120 may correlate user-selected input on the controller with movements on the screen. For example, if the controller is input to move an element on the user's portion of the screen to the left, then split-screen visualization application 120 may identify the corresponding element on screen moving to the left. If the controller is input to open a menu on the user's portion of the screen, then split-screen visualization application 120 may identify the corresponding portion of the display screen on which a menu has appeared. In another embodiment, split-screen visualization application 120 may utilize semantic understanding of game content and prompt one or more controller input for the user to execute. For example, split-screen visualization application 120 may prompt the user to execute controller input corresponding to moving an element on the user's portion of the screen to the left and then to the right. In an embodiment in which more than one movement and input are correlated, split-screen visualization application 120 may utilize a predictive algorithm for display screen to AR correlation. The algorithm may utilize user input on the controller and visual changes on the display screen to determine a level of confidence that a particular portion of the screen corresponds to the user. If the level of confidence exceeds a predetermined threshold value, split-screen visualization application 120 may establish a positive association with the corresponding portion of the display screen and the user. In yet another embodiment, split-screen visualization application 120 may allow for a manual override, where the user selects the corresponding portion of the display screen using an action known in the art. These actions include, but are not limited to, input on the videogame controller and pointing to the portion of the screen corresponding to the user.

Isolating (250) a portion of the display screen belonging to the user may include split-screen visualization application 120 ignoring one or more portions of the display screen not belonging to the user. In some embodiments, split-screen visualization application 120 may use a camera operably connected to the AR-enabled equipment to ignore the one or more portions of the display screen not belonging to the user. In other embodiments, split-screen visualization application 120 may use the selected content stream to ignore the one or more portions of the display screen not belonging to the user. In some embodiments, split-screen visualization application 120 may use the physical location of the portion of the screen to ignore the one or more portions of the display screen not belonging to the user. In another embodiment, split-screen visualization application 120 may identify the physical location of the one or more portions of the display screen not belonging to the user and ignore them. In yet another embodiment, split-screen visualization application 120 may prompt the user to manually identify the one or more portions of the display screen not belonging to the user. Once identified, split-screen visualization application 120 may ignore the one or more portions of the display screen not belonging to the user. Manual identification of the one or more portions of the display screen not belonging to the user may include, but is not limited to, user input on the videogame controller and the user physically pointing to the one or more portions of the display screen not belonging to the user.

Obscuring (260) one or more portions of the display screen not belonging to the user may include split-screen visualization application 120 obfuscating the one or more portions of the display screen not belonging to the user. In some embodiments, split-screen visualization application 120 may create one or more artifacts to overlay over the one or more portions of the display screen not belonging to the user. In some embodiments, the one or more artifacts may appear solid black, effectively blacking out the one or more portions of the display screen not belonging to the user. In another embodiment, split-screen visualization application 120 may render a black box with a transparency value of zero over the one or more portions of the display screen not belonging to the user. Split-screen visualization application 120 may utilize object tracking to maintain the obscuring of the one or more portions of the display screen not belonging to the user as the viewpoint of AR-enabled equipment. For example, if the user is wearing AR-enabled equipment, object tracking may keep solid black artifacts over the portions of the screen not belonging to the user even as the user moves and changes the perspective of the AR-enabled equipment.

Enhancing (270) the portion of the display screen belonging to the user may include split-screen visualization application 120 highlighting the user's portion of the display screen to improve the visual quality. In some embodiments, split-screen visualization application 120 may apply filters to improve the visual quality of the user's screen. Filters may include, but are not limited to, increasing brightness, adjusting color sharpness, and glare reduction. In another embodiment, split-screen visualization application 120 may apply zoom/magnification filters to the user's portion of the display screen. Split-screen visualization application 120 may enlarge the user's portion of the display screen to the size of the entire display screen. In another embodiment, split-screen visualization application 120 may enlarge the screen to a predetermined size. In some embodiment, split-screen visualization application 120 may provide options to the user for enhancing the user's screen to the user. In another embodiment, split-screen visualization application 120 may be connected to a user's profile from which it may retrieve data related to enhancing the user's screen.

FIG. 3 is a flowchart depicting a split-screen visualization method 300 for enhanced visualization and facilitation of a local shared-screen multiplayer videogaming system via player-based augmented reality (AR) for a videogaming system that is AR compatible. As depicted, method 300 includes connecting (310) to an AR compatible videogaming system, selecting (320) a content stream from the AR compatible videogaming system, determining (330) whether the content stream corresponds to a full display screen or a portion of a display screen, activating (340) a camera on an AR-enabled equipment, determining (350) a portion of the display screen belonging to a user, isolating (360) the portion of the display screen belonging to the user, obscuring (370) one or more portions of the display screen not belonging to the user, and enhancing (380) the portion of the display screen belonging to the user.

Synching (310) an AR-enabled equipment to an AR compatible videogaming system may include split-screen visualization application 120 connecting to the AR compatible videogaming system. In some embodiments, split-screen visualization application 120 may connect to the videogaming system via a wireless connection. Wireless connections include, but are not limited to, Bluetooth and WIFI. In other embodiments, split-screen visualization application 120 may connect to the videogaming system via a physical connection. Examples of physical connections include, but are not limited to, coaxial cables and fiber optic cables.

Selecting (320) a content stream from the AR compatible videogaming system may include split-screen visualization application 120 receiving data from the AR compatible videogaming system. In some embodiments, split-screen visualization application 120 may request the data from the AR compatible videogaming system before it receives data. In another embodiment, split-screen visualization application 120 may receive data from the AR compatible videogaming system once it is synched with the AR compatible videogaming system.

Determining (330) whether the content stream corresponds to a full display screen or a portion of a display screen belonging to the user may include split-screen visualization application 120 analyzing the selected content stream to identify whether the output signal corresponding to the content stream includes a single perspective or multiple split-screen perspectives. If the content stream corresponds to a full display screen, then split-screen visualization application 120 may activate (340) a camera on an AR-enabled equipment. If the content stream corresponds to a portion of a display screen belonging to a user, then split-screen visualization application 120 may obscure (370) one or more portions of the display screen not belonging to the user.

Activating (340) a camera on an AR-enabled equipment may include split-screen visualization application 120 enabling a camera that is operably connected to the AR-enabled equipment. In at least one embodiment, split-screen visualization application 120 may enable the camera concurrently with the activation of the AR-enabled equipment. In another embodiment, split-screen visualization application 120 may enable the camera after the AR-enabled equipment are activated. In yet another embodiment, a user may activate the camera. Examples of AR-enabled equipment include, but are not limited to, glasses and headsets.

Determining (350) a portion of the display screen belonging to a user may include split-screen visualization application 120 correlating one or more movements on the screen with one or more user inputs on a videogaming system controller. In some embodiments, split-screen visualization application 120 may use a camera operably connected to the AR-enabled equipment to correlate one or more movements on the screen with one or more user inputs on the videogaming system controller. In other embodiments, split-screen visualization application 120 may use the selected content stream to correlate one or more movements on the screen with one or more user inputs on a videogaming system controller. In some embodiments, split-screen visualization application 120 may correlate user-selected input on the controller with movements on the screen. For example, if the controller is input to move an element on the user's portion of the screen to the left, then split-screen visualization application 120 may identify the corresponding element on screen moving to the left. If the controller is input to open a menu on the user's portion of the screen, then split-screen visualization application 120 may identify the corresponding portion of the display screen on which a menu has appeared. In another embodiment, split-screen visualization application 120 may utilize semantic understanding of game content and prompt one or more controller input for the user to execute. For example, split-screen visualization application 120 may prompt the user to execute controller input corresponding to moving an element on the user's portion of the screen to the left and then to the right. In an embodiment in which more than one movement and input are correlated, split-screen visualization application 120 may utilize a predictive algorithm for display screen to AR correlation. The algorithm may utilize user input on the controller and visual changes on the display screen to determine a level of confidence that a particular portion of the screen corresponds to the user. If the level of confidence exceeds a predetermined threshold value, split-screen visualization application 120 may establish a positive association with the corresponding portion of the display screen and the user. In yet another embodiment, split-screen visualization application 120 may allow for a manual override, where the user selects the corresponding portion of the display screen using an action known in the art. These actions include, but are not limited to, input on the videogame controller and pointing to the portion of the screen corresponding to the user.

Provided here is an example of an algorithm used to determine (350) a portion of the display screen belonging to a user. The algorithm below determines a confidence level Conf, and if the confidence exceeds a predetermined threshold value, establishes a positive association with the corresponding portion of the screen and the user.

$$Conf = \sum_{1}^{N} 1 - TD_n$$

In this example, split-screen visualization application 120 detects N number of inputs on a user's videogame controller. Split-screen visualization application 120 may detect N over a predetermined period of time, 10 seconds for example, until it has established a positive association. TD represents the time difference between an input on the controller and a significant action occurring on a portion of the display screen, wherein each input n has a corresponding TD, represented as $TD_n$. In an embodiment in which the display screen is split into quadrants, split-screen visualization application 120 may define a significant action as occurring on the display screen where 25% of pixels have a color shift of over 200 digits in RGB. In an embodiment in which the display screen is split into halves, split-screen visualization application 120 may define a significant action as occurring on the display screen where 50% of pixels have a color shift of over 200 digits in RGB. In general, the percentage of pixels that have a color shift of over a number of digits in RGB may reflect the size of the portion of the display screen on which the color shift occurs, wherein the size of the portion is a proportion of the entire display screen.

Isolating (360) the portion of the display screen belonging to the user may include split-screen visualization application 120 ignoring one or more portions of the display screen not belonging to the user. In some embodiments, split-screen visualization application 120 may use a camera operably connected to the AR-enabled equipment to ignore the one or more portions of the display screen not belonging to the user. In other embodiments, split-screen visualization application 120 may use the selected content stream to ignore the one or more portions of the display screen not belonging to the user. In some embodiments, split-screen visualization application 120 may use the physical location of the portion of the screen to ignore the one or more portions of the display screen not belonging to the user. In another embodiment, split-screen visualization application 120 may identify the physical location of the one or more portions of the display screen not belonging to the user and ignore them. In yet another embodiment, split-screen visualization application 120 may prompt the user to manually identify the one or more portions of the display screen not belonging to the user. Once identified, split-screen visualization application 120 may ignore the one or more portions of the display screen not belonging to the user. Manual identification of the one or more portions of the display screen not belonging to the user may include, but is not limited to, user input on the videogame controller and the user physically pointing to the one or more portions of the display screen not belonging to the user.

Obscuring (370) one or more portions of the display screen not belonging to the user may include split-screen visualization application 120 obfuscating the one or more portions of the display screen not belonging to the user. In some embodiments, split-screen visualization application 120 may create one or more artifacts to overlay over the one or more portions of the display screen not belonging to the user. In some embodiments, the one or more artifacts may appear solid black, effectively blacking out the one or more portions of the display screen not belonging to the user. In another embodiment, split-screen visualization application 120 may render a black box with a transparency value of zero over the one or more portions of the display screen not belonging to the user. Split-screen visualization application 120 may utilize object tracking to maintain the obscuring of the one or more portions of the display screen not belonging to the user as the viewpoint of AR-enabled equipment. For example, if the user is wearing AR-enabled equipment, object tracking may keep solid black artifacts over the portions of the screen not belonging to the user even as the user moves and changes the perspective of the AR-enabled equipment.

Enhancing (380) the portion of the display screen belonging to the user may include split-screen visualization application 120 highlighting the user's portion of the display screen to improve the visual quality. In some embodiments, split-screen visualization application 120 may apply filters to improve the visual quality of the user's screen. Filters may include, but are not limited to, increasing brightness, adjusting color sharpness, and glare reduction. In another embodiment, split-screen visualization application 120 may apply zoom/magnification filters to the user's portion of the display screen. Split-screen visualization application 120 may enlarge the user's portion of the display screen to the size of the entire display screen. In another embodiment, split-screen visualization application 120 may enlarge the screen to a predetermined size. In some embodiment, split-screen visualization application 120 may provide options to the user for enhancing the user's screen to the user. In another embodiment, split-screen visualization application 120 may be connected to a user's profile from which it may retrieve data related to enhancing the user's screen.

FIG. 4 is a flowchart depicting a split-screen visualization method 400 for enhanced visualization and facilitation of a local shared-screen multiplayer videogaming system via player-based augmented reality (AR) for videogaming systems that are not AR compatible. As depicted, method 400 includes activating (410) a camera on an AR-enabled equipment, identifying (420) two or more portions of a display screen belonging to two or more users, determining (430) a portion of the display screen belonging to a user, isolating (440) the portion of the display screen belonging to the user, obscuring (450) one or more portions of the display screen not belonging to the user, and enhancing (460) the portion of the display screen belonging to the user.

Activating (410) a camera on an AR-enabled equipment may include split-screen visualization application 120 enabling a camera that is operably connected to the AR-enabled equipment. In at least one embodiment, split-screen visualization application 120 may enable the camera concurrently with the activation of the AR-enabled equipment. In another embodiment, split-screen visualization application 120 may enable the camera after the AR-enabled equipment are activated. In yet another embodiment, a user may activate the camera. Examples of AR-enabled equipment include, but are not limited to, glasses and headsets.

Identifying (420) two or more portions of a screen belonging to two or more users may include split-screen visualization application 120 detecting display screen using the camera that is operably connected to the AR-enabled equipment. Split-screen visualization application 120 may then detect the semantic concept of player screens on the display screen using the camera that is operably connected to the AR-enabled equipment. Detecting the semantic concept of player screens may include split screen application 120 detecting screen dividers on the display screen. Screen dividers may be indicated by any visual representation of a division of a display screen, including, but not limited to, dividing lines and borders around each distinct portion of the whole display screen. The display screen may be divided into two or more portions, reflecting the two or more users of the local shared-screen multiplayer videogaming system. For example, the display screen may be divided into four quadrants, each corresponding to one of four users of the local shared-screen multiplayer videogaming system. If there are three users, the display screen may be divided into four quadrants: three screens each corresponding to one of the three users and one blank screen. If there are two users, the display screen may be divided in half, where each half corresponds to one of the two users. Divisions in half may be vertical or horizontal. In some embodiments, the size of each portion of the display screen is proportional to the number of users. In another embodiment, the size of each portion of the display screen is not proportional to the number of users. In at least one embodiment, split-screen visualization application 120 may use an image recognition algorithm with machine learning to detect screen dividers. An image recognition algorithm may employ a Bi-Long-Term Short Term Memory (LSTM)—Convolutional Neural Network (CNN) model. In an embodiment that employs a Bi-LSTM—CNN model, split-screen visualization application 120 may take into account data sets from a user's profile pertaining to interests of comfort, such as facial recognition, conversation analysis, and MFCC speech features. The convolution layer's output will be pooled to a smaller dimension and ultimately outputted as either a positive or negative label. Multiple contours based on CNN may be created in a sequence on the screen C [C1, C2, . . . Cn] with events E (E1, E2, . . . En) corresponding to the user's metadata fetched from profiling Ui [U1, U2, . . . Un]. The algorithm may then deploy Pearson correlation for similarity analysis with contours pertaining to the user's interests in order to curate the final dimensions and orientation of the two or more portions of the screen and perform the splitting of the screen with a classifier model.

Determining (430) a portion of the display screen belonging to a user may include split-screen visualization application 120 correlating one or more movements on the screen with one or more user inputs on a videogaming system controller. In some embodiments, split-screen visualization application 120 may correlate user-selected input on the controller with movements on the screen. For example, if the controller is input to move an element on the user's portion of the screen to the left, then split-screen visualization application 120 may identify the corresponding element on screen moving to the left. If the controller is input to open a menu on the user's portion of the screen, then split-screen visualization application 120 may identify the corresponding portion of the display screen on which a menu has appeared. In another embodiment, split-screen visualization application 120 may utilize semantic understanding of game content and prompt one or more controller input for the user to execute. For example, split-screen visualization application 120 may prompt the user to execute controller input corresponding to moving an element on the user's portion of the screen to the left and then to the right. In an embodiment in which more than one movement and input are correlated, split-screen visualization application 120 may utilize a predictive algorithm for display screen to AR correlation. The algorithm may utilize user input on the controller and visual changes on the display screen to determine a level of confidence that a particular portion of the screen corresponds to the user. If the level of confidence exceeds a predetermined threshold value, split-screen visualization application 120 may establish a positive association with the corresponding portion of the display screen and the user. In yet another embodiment, split-screen visualization application 120 may allow for a manual override, where the user selects the corresponding portion of the display screen using an action known in the art. These actions include, but are not limited to, input on the videogame controller and pointing to the portion of the screen corresponding to the user.

Provided here is an example of an algorithm used to determine (430) a portion of the display screen belonging to a user. The algorithm below determines a confidence level Conf, and if the confidence exceeds a predetermined threshold value, establishes a positive association with the corresponding portion of the screen and the user.

$$Conf = \sum_{1}^{N} 1 - TD_n$$

In this example, split-screen visualization application 120 detects N number of inputs on a user's videogame controller. Split-screen visualization application 120 may detect N over a predetermined period of time, 10 seconds for example, until it has established a positive association. TD represents the time difference between an input on the controller and a significant action occurring on a portion of the display screen, wherein each input n has a corresponding TD, represented as $TD_n$. In an embodiment in which the display screen is split into quadrants, split-screen visualization application 120 may define a significant action as occurring on the display screen where 25% of pixels have a color shift of over 200 digits in RGB. In an embodiment in which the display screen is split into halves, split-screen visualization application 120 may define a significant action as occurring on the display screen where 50% of pixels have a color shift of over 200 digits in RGB. In general, the percentage of pixels that have a color shift of over a number of digits in RGB may reflect the size of the portion of the display screen on which the color shift occurs, wherein the size of the portion is a proportion of the entire display screen.

Isolating (440) the portion of the display screen belonging to the user may include split-screen visualization application 120 ignoring one or more portions of the display screen not belonging to the user. In some embodiments, split-screen visualization application 120 may use the physical location of the portion of the screen determined to belong to the user in step 430 to ignore the one or more portions of the display screen not belonging to the user. In another embodiment, split-screen visualization application 120 may identify the physical location of the one or more portions of the display screen not belonging to the user and ignore them. In yet another embodiment, split-screen visualization application 120 may prompt the user to manually identify the one or more portions of the display screen not belonging to the user. Once identified, split-screen visualization application 120 may ignore the one or more portions of the display screen not belonging to the user. Manual identification of the one or more portions of the display screen not belonging to the user may include, but is not limited to, user input on the videogame controller and the user physically pointing to the one or more portions of the display screen not belonging to the user.

Obscuring (450) one or more portions of the display screen not belonging to the user may include split-screen visualization application 120 obfuscating the one or more portions of the display screen not belonging to the user. In some embodiments, split-screen visualization application 120 may create one or more artifacts to overlay over the one or more portions of the display screen not belonging to the user. In some embodiments, the one or more artifacts may appear solid black, effectively blacking out the one or more portions of the display screen not belonging to the user. In another embodiment, split-screen visualization application 120 may render a black box with a transparency value of zero over the one or more portions of the display screen not belonging to the user. Split-screen visualization application 120 may utilize object tracking to maintain the obscuring of the one or more portions of the display screen not belonging to the user as the viewpoint of AR-enabled equipment. For example, if the user is wearing AR-enabled equipment, object tracking may keep solid black artifacts over the portions of the screen not belonging to the user even as the user moves and changes the perspective of the AR-enabled equipment.

Enhancing (460) the portion of the display screen belonging to the user may include split-screen visualization application 120 highlighting the user's portion of the display screen to improve the visual quality. In some embodiments, split-screen visualization application 120 may apply filters to improve the visual quality of the user's screen. Filters may include, but are not limited to, increasing brightness, adjusting color sharpness, and glare reduction. In another embodiment, split-screen visualization application 120 may apply zoom/magnification filters to the user's portion of the display screen. Split-screen visualization application 120 may enlarge the user's portion of the display screen to the size of the entire display screen. In another embodiment, split-screen visualization application 120 may enlarge the screen to a predetermined size. In some embodiment, split-screen visualization application 120 may provide options to the user for enhancing the user's screen to the user. In another embodiment, split-screen visualization application 120 may be connected to a user's profile from which it may retrieve data related to enhancing the user's screen.

FIG. 5 depicts a block diagram of components of a computer 500 in accordance with an illustrative embodiment of the present invention. In at least one embodiment, computer 500 corresponds to video gaming system 130. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
    syncing, by one or more processors, augmented reality (AR) enabled equipment to a videogaming system;
    identifying, by one or more processors, two or more portions of a display screen belonging to two or more players;
    identifying, by one or more processors, a portion of the display screen belonging to a selected user and one or more remaining portions of the display screen not belonging to the selected user;
    determining, by one or more processors, a confidence level indicating a level of confidence that the portion of the display screen belongs to the selected user;
    obscuring, by one or more processors, the one or more portions of the display screen not belonging to the selected user; and
    displaying, by one or more processors, the determined portion of the display screen belonging to the selected user via the synced AR enabled equipment.

2. The computer implemented method of claim 1, further comprising activating a camera on the AR-enabled equipment.

3. The computer implemented method of claim 1, further comprising displaying the one or more remaining portions of the display screen to additional users.

4. The computer implemented method of claim 1, further comprising enhancing the determined portion of the display screen belonging to the selected user.

5. The computer implemented method of claim 1, wherein the confidence level is inversely correlated to a time difference between a controller input corresponding to the selected user and a significant action occurring on the portion of the display screen.

6. The computer implemented method of claim 5, wherein the significant action corresponds to a shift in at least 25% of pixels within the portion of the display screen.

7. A computer program product comprising:
    one or more computer readable storage media and program instructions stored on the one or more computer readable storage media, the program instructions comprising instructions to:
    sync augmented reality (AR) enabled equipment to a videogaming system;
    identify two or more portions of a display screen belonging to two or more players;
    identify a portion of the display screen belonging to a selected user and one or more remaining portions of the display screen not belonging to the selected user;
    determine a confidence level indicating a level of confidence that the portion of the display screen belongs to the selected user;
    obscure the one or more portions of the display screen not belonging to the selected user; and
    display the determined portion of the display screen belonging to the selected user via the synced AR enabled equipment.

8. The computer program product of claim 7, further comprising instructions to activate a camera on the AR-enabled equipment.

9. The computer program product of claim 7, further comprising instructions to display the one or more remaining portions of the display screen to additional users.

10. The computer program product of claim 7, further comprising instructions to enhance the determined portion of the display screen belonging to the selected user.

11. The computer program product of claim 7, wherein the confidence level is inversely correlated to a time difference between a controller input corresponding to the selected user and a significant action occurring on the portion of the display screen.

12. The computer program product of claim 11, wherein the significant action corresponds to a shift in at least 25% of pixels within the portion of the display screen.

13. A computer system comprising:
    one or more computer processors;
    one or more computer-readable storage media;
    program instructions stored on the computer-readable storage media for execution by at least one of the one or more processors, the program instructions comprising instructions to:
    sync augmented reality (AR) enabled equipment to a videogaming system;
    identify two or more portions of a display screen belonging to two or more players;
    identify a portion of the display screen belonging to a selected user and one or more remaining portions of the display screen not belonging to the selected user;
    determine a confidence level indicating a level of confidence that the portion of the display screen belongs to the selected user;
    obscure the one or more portions of the display screen not belonging to the selected user; and
    display the determined portion of the display screen belonging to the selected user via the synced AR enabled equipment.

14. The computer system of claim 13, further comprising instructions to activate a camera on the AR-enabled equipment.

15. The computer system of claim 13, further comprising instructions to display the one or more remaining portions of the display screen to additional users.

16. The computer system of claim 13, further comprising instructions to enhance the determined portion of the display screen belonging to the selected user.

17. The computer system of claim 13, wherein the confidence level is inversely correlated to a time difference between a controller input corresponding to the selected user and a significant action occurring on the portion of the display screen.

* * * * *